(12) United States Patent
Gao et al.

(10) Patent No.: US 12,338,324 B2
(45) Date of Patent: Jun. 24, 2025

(54) METHOD FOR SYNTHESIS AND MODIFICATION OF BIO-BASED POLYAMIDE

(71) Applicant: Qingdao University of Science & Technology, Qingdao (CN)

(72) Inventors: Chuanhui Gao, Qingdao (CN); Jing Zhang, Qingdao (CN); Yiliang Gao, Qingdao (CN); Ying Ma, Qingdao (CN); Yuetao Liu, Qingdao (CN); Chuanxing Wang, Qingdao (CN); Yumin Wu, Qingdao (CN)

(73) Assignee: Qingdao University of Science & Technology, Qingdao (CN)

( * ) Notice: Subject to any disclaimer, the term of this patent is extended or adjusted under 35 U.S.C. 154(b) by 631 days.

(21) Appl. No.: 17/659,071

(22) Filed: Apr. 13, 2022

(65) Prior Publication Data

US 2022/0332891 A1 Oct. 20, 2022

(30) Foreign Application Priority Data

Apr. 16, 2021 (CN) .......................... 202110412996.7

(51) Int. Cl.
  *C08G 69/28* (2006.01)
  *C08G 18/40* (2006.01)
  *C08G 75/04* (2016.01)
  *C08L 79/04* (2006.01)

(52) U.S. Cl.
  CPC ............ *C08G 69/28* (2013.01); *C08G 18/40* (2013.01); *C08G 75/04* (2013.01); *C08L 79/04* (2013.01)

(58) Field of Classification Search
  CPC ......... C08G 69/28; C08G 18/10; C08L 75/04; C08L 79/04
  See application file for complete search history.

(56) References Cited

U.S. PATENT DOCUMENTS

2010/0256777 A1* 10/2010 Datta ...................... A61L 27/58
                                                            623/23.72
2021/0355265 A1* 11/2021 Yamamoto ......... C08G 18/4854

FOREIGN PATENT DOCUMENTS

CN         106893096 A  *  6/2017  ............. C08G 69/26
JP         2019524945 A  *  9/2019

OTHER PUBLICATIONS

Ayadi et al (Synthesis of bis(pyrrolidone-4-carboxylic acid)-based polyamides derived from renewable itaconic acid—application as a compatibilizer in biopolymer blends, Polymer Journal (2013) 45, 766-774, published online Dec. 5, 2012).*

* cited by examiner

*Primary Examiner* — Gregory Listvoyb
(74) *Attorney, Agent, or Firm* — DLA PIPER LLP (US)

(57) ABSTRACT

The present disclosure is related to the field of polymer materials, and, in particular, to a method for synthesizing a bio-based polyamide. More specifically, the disclosure provides a method for synthesizing a block copolymer consisting of a hard segment of a polyamide prepared via solid state polycondensation and a soft segment of a polyether polyol. Due to a reaction of itaconic acid, which contains a carbon-carbon double bond, with hexamethylenediamine, the bio-based polyamide is greatly different from conventional linear polyamides and exhibits a lower glass transition temperature and excellent mechanical properties. Unlike conventional processes for preparing modified polyamides, the bio-based polyamide is synthesized, according to the method, through chain extension of a polyamide with an excess amount of a diisocyanate based on amine value of the polyamide and then crosslinking of the resulting product with a polyether polyol by using glycerol as a crosslinking agent.

7 Claims, 2 Drawing Sheets

METHOD FOR SYNTHESIS AND MODIFICATION OF BIO-BASED POLYAMIDE

CROSS REFERENCE TO RELATED APPLICATION

This application claims priority to Chinese Application No. 202110412996.7, filed on Apr. 16, 2021, the content of which is incorporated herein by reference in its entirety.

TECHNICAL FIELD

The present disclosure is related to the field of polymer materials, and, in particular, to a method for synthesizing a bio-based polyamide (that is polyamide 65 or PA 65) by subjecting an amino end-capped polyamide prepared via solid state polycondensation to a chain extending reaction with a diisocyanate and then to a further reaction (to modify the product resulting from the chain extending reaction) with a polyether polyol (which will later be a soft segment of the bio-based polyamide to be synthesized) by using glycerol as a crosslinking agent.

BACKGROUND ART

Polyamide is a polymer with various excellent properties, including not only high mechanical strength, good thermal stability, and excellent corrosion resistance but also excellent machineability, good dimensional stability, a small linear expansion coefficient, high cost-effectiveness, and excellent electrical insulation and aging resistance. In addition, polyamide is nontoxic and odorless. Further, it may be easily alloyed with an amorphous or semi-crystalline polyamide. Moreover, it is superior to other common polymers in terms of resistances to environmental stress cracking, oily solvent, scratch, and abrasion. Due to these advantages, polyamides have been extensively used instead of metals such as copper for the manufacture of bearings, gears, pump impellers, and other parts in various industries such as mechanical, chemical, instrumentation and automotive industries. Therefore, nowadays, polyamides play an important part in our daily life which cannot be substituted by other polymers.

There has been proposed a method for preparing polyamide 6 (PA6)-based thermoplastic elastomers (TPEs) through formation of what will later be a hard segment of the TPEs consisting of PA6 and a diisocyanate via hydrolytic ring-opening polymerization, followed by addition of a polyether (which will later be a soft segment of the TPEs) to conduct esterification and polycondensation reaction. For this method, it is necessary to add the diisocyanate with the system held at high temperature. This may cause harmful effect on the human bodies. There has also been proposed a method for preparing 2,5-furandicarboxylic acid (FDCA), which exhibits excellent heat resistance, transparency, and mechanical properties, but much lower wear resistance and hydrophilicity than polyamides.

SUMMARY

In view of the above problems, one objective of the present disclosure is to provide a method for synthesizing a bio-based polyamide (referred to herein as polyamide 65 or PA 65) which has a lower glass transition temperature and excellent mechanical properties. In an embodiment, the method may comprise: subjecting an amino end-capped polyamide prepared via a two step process to a chain extending reaction with a diisocyanate by using N,N-dimethylformamide (DMF) as a solvent, and then to a further reaction with a polyether polyol (which will later be a soft segment of the bio-based polyamide to be synthesized) at a temperature of 60 to 80° C. for about 3 hours with glycerol as a crosslinking agent and dibutyltin dilaurate as a catalyst; and pouring the reaction mixture into a Teflon mold followed by an evaporation of the solvent performed in a vacuum oven at about 70° C.

A first aspect of the disclosure provides an itaconic acid-based polyamide 65 (IAHD), represented by the following structural formula:

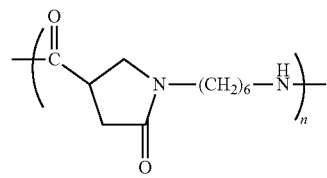

where, n is an integer of 2 to 300.

A second aspect of the disclosure provides a method for synthesizing a bio-based polyamide, comprising:
performing a chain extending reaction of an itaconic acid-based polyamide 65 with a diisocyanate; and
crosslinking the itaconic acid-based polyamide 65 after chain extension, represented by the following structural formula, and a polyether polyol.

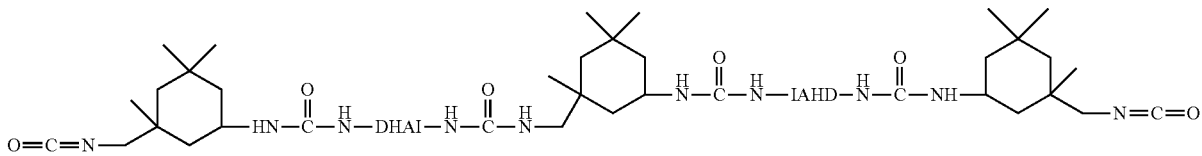

A polyether polyol is employed to modify the itaconic acid-based polyamide 65 and will later be a soft segment of the bio-based polyamide to be synthesized. The itaconic acid-based polyamide 65 will later be a hard segment of the bio-based polyamide to be synthesized. The hard segment determines some properties of the product including the density, hardness, melting point, tensile strength, and resistance to organic chemicals. The polyether polyol, which will later be a soft segment of the bio-based polyamide to be synthesized, may include polycaprolactone (PCL), polyethylene glycol (PEG), polyoxypropylene glycol (PPG), and polytetrahydrofuran (PTMG). The soft segment determines properties of the product including the low-temperature characteristic, moisture absorption property, antistatic property, dyeability, and stability to certain chemicals. By adjusting the types, ratios, relative molecular weights, and arrangement of the hard and soft segments, the product can be obtained with different properties in terms of hardness, density, heat resistance, and/or moisture absorption ability, thereby meeting the market demands.

A third aspect of the disclosure provides a bio-based polyamide synthesized by the method according to the second aspect of the disclosure.

A fourth aspect of the disclosure provides the use of the bio-based polyamide in fields of mechanical industry, chemical industry, instrumentation and automobile manufacturing.

The present disclosure provides several advantages over the prior art.

The itaconic acid-based polyamide 65, as a starting material, is based on itaconic acid which is a bio-based and thus environmentally friendly material. This may reduce the dependency on non-renewable energies and favor the creation of a recycling society. Due to the presence of a carbon-carbon double bond in the itaconic acid molecule, a pyrrolidone ring is formed during the reaction, which enables the polyamide produced by the reaction to have an improved rigidity compared with conventional linear polyamides and thus results in an itaconic acid-based polyamide 65 with excellent mechanical properties.

The present synthesis method is simple, cost effective, and can be scaled up.

BRIEF DESCRIPTION OF THE DRAWINGS

The accompanying drawings are included to provide a further understanding of the disclosure and are incorporated into and constitute a part of this specification. The following examples further illustrate the disclosure but, of course, should not be construed as limiting the disclosure.

DETAILED DESCRIPTION OF THE EMBODIMENTS

Figure 1:
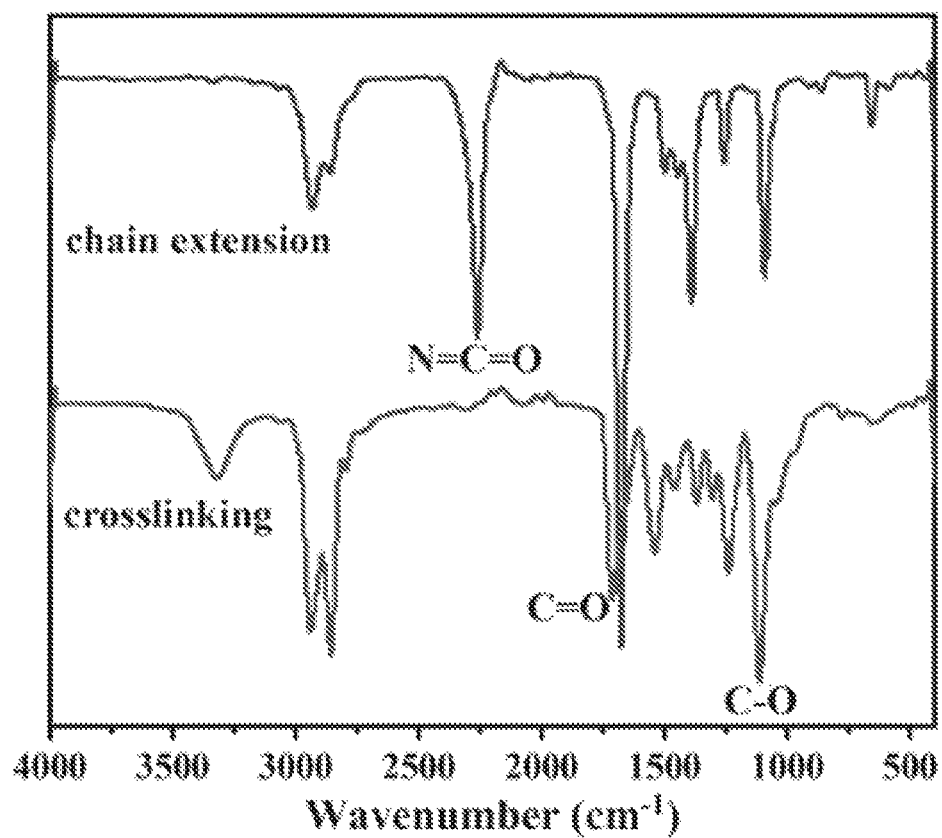
FIG. 1 is a graph showing infrared absorption spectrums of products obtained, in Example 1, after chain extension and cross-linking, respectively.

It is to be understood that the following detailed description is exemplary and is intended to provide further explanation of the embodiments of the disclosure. Unless otherwise defined, all terms (including technical and scientific terms) used herein have the same meaning as commonly understood by one of ordinary skill in the art to which the embodiments of the disclosure belong.

The terminology used in the description of the disclosure herein is for the purpose of describing particular embodiments only and is not intended to limit the scope of the disclosure. An expression of a singular form includes an expression of a plural form unless otherwise indicated. Further, it will be understood that the terms "comprises" and/or "comprising", or "includes" and/or "including" when used in this specification, specify the presence of stated features, steps, operations, elements, and/or components, but do not preclude the presence or addition of one or more other features, steps, operations, elements, and/or components.

An embodiment of the disclosure is directed to a modified polyamide having high breaking strength and elongation at break, which is produced by modifying an amino end-capped polyamide 65 with a diisocyanate and then subjecting the resulting product to a reaction with glycerol and a polyether polyol.

In a particular embodiment, an amino end-capped polyamide prepared via a two step process is subjected to a chain extending reaction with a diisocyanate by using N,N-dimethylformamide (DMF) as a solvent, and then to a further reaction with a polyether polyol (which will later be a soft segment of the bio-based polyamide to be synthesized) at a temperature of 60 to 80° C. for about 3 hours with glycerol as a crosslinking agent and dibutyltin dilaurate as a catalyst. The reaction mixture is then poured into a Teflon mold followed by an evaporation of the solvent performed in a vacuum oven at about 70° C. A modified polyamide material of polyurethane type is thus obtained.

The polyamide used may be an itaconic acid-based polyamide 65. The polyether polyol used may be polytetrahydrofuran (PTMG), polyethylene glycol (PEG), or polypropylene glycol (PPG), preferably PTMG. The diisocyanate used may be isophorone diisocyanate (IPDI) or hexamethylene diisocyanate (HDI), preferably IPDI.

In an embodiment, the itaconic acid-based polyamide 65 is used in an amount of 2.5 to 20% by weight with respect to the total amount of the reactants of the two reactions (i.e., the chain extending reaction and the crosslinking reaction) that are the itaconic acid-based polyamide 65, the diisocyanate, the polyether polyol, and the glycerol. In an embodiment, the diisocyanate is used in an amount of 10 to 75% by weight with respect to the total amount of the reactants of the two reactions. In an embodiment, the polyether polyol and the glycerol are each used in an amount of 0 to 85% by weight with respect to the total amount of the reactants of the two reactions. In an embodiment, the catalyst is used in an amount of 0 to 8% by weight with respect to the total amount of the reactants of the two reactions.

In a further particular embodiment, 10 to 20 parts by weight of an itaconic acid-based polyamide 65 prepared via a two step process are reacted with 10 to 75 parts by weight of a diisocyanate in DMF as a solvent at room temperature for 10 to 40 minutes. To the reaction mixture are added 0 to 10 parts by weight of glycerol, 0 to 95 parts by weight of polyether polyol, and 0 to 3 parts by weight of dibutyltin dilaurate, and the mixture is reacted at 60 to 80° C. for about 3 hours. The resulting reaction mixture is poured into a Teflon mold followed by an evaporation of the solvent performed in a vacuum oven at about 70° C. A modified polyamide having high breaking strength and elongation at break is thus obtained.

In an embodiment, the polyamide used is itaconic acid-based polyamide 65, which has lower moisture absorption ability and higher dimensional stability than conventional linear polyamides, and has a molecular weight within a range of from 2,000 to 30,000.

The itaconic acid-based polyamide 65 has the following structural formula:

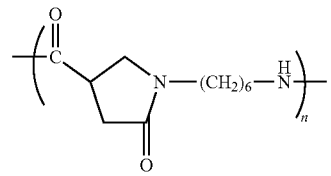

where, n is an integer of 2 to 300.

The obtained polyamide of polyurethane type may have a molecular weight within a range of from 4,000 to 40,000.

In an embodiment, the polyamide 65 of polyurethane type is synthesized as follows.

(1) Synthesis of Itaconic Acid-Based Polyamide 65
Salt Formation

An amount of itaconic acid is weighed out and dissolved in ethanol. An amount of hexamethylenediamine (HMDA) is heated in a water bath so that it is changed from solid to liquid. A portion of the liquid HMDA is poured into the itaconic acid solution, and the mixture is reacted at about 60° C. for about 30 minutes. The resulting reaction mixture is cooled, filtered with suction, and then washed with absolute ethanol for three times. The washed crystals (that is a crystalline salt) are dried in a vacuum oven at about 40° C. for about 12 hours.

Melt Polycondensation of Salt Monomers

The salt obtained above is placed in a four-neck flask, and air within the flask is then replaced by nitrogen. The crystalline salt in the flask is subjected to a melt polycondensation reaction through agitation. The melt polycondensation reaction may be conducted in three stages: a first stage, conducted at about 150° C. and at an agitation speed of from 100 to 300 rpm with continuous generation of vapour during this stage; a second stage, conducted at about 160° C. and an agitation speed of from 150 to 250 rpm for about 3 hours; and a third stage, conducted at the same temperature as that of the second stage for about 6 hours with the interior of the reactor being evacuated to a pressure equal to about 0.1 MPa. To the resulting reaction mixture is added HMDA in an amount of 2% by weight with respect to the amount of the crystalline salt, and the mixture is reacted for 0.5 hours so as to obtain an amino end-capped polyamide.

Determination of Amine Value 1 to 2 g of the sample is weighed into a conical flask, into which 50 ml of ethanol is then added. After complete dissolution, five drops of bromophenol blue indicator solution is added to the solution, and the solution is titrated with hydrochloric acid (HCl) standard solution until the solution color changes to yellow. The amine value of the amino end-capped polyamide is determined based on the concentration of the HCl standard solution and the volume of the HCl standard solution used.

(2) Chain Extension of Itaconic Acid-Based Polyamide 65

0.5 g of itaconic acid-based polyamide 65 obtained above is weighed out. An amount of a diisocyanate is added to DMF at a ratio of 3 to 1 in terms of [NCO]/[NH$_2$] based on the amine value determined above. A reaction between the itaconic acid-based polyamide 65 and the diisocyanate is conducted at room temperature until all the solids are dissolved.

(3) Crosslinking of Itaconic Acid-Based Polyamide 65

Appropriate amounts of glycerol and polyether polyol are added to the reaction mixture obtained above to conduct a reaction at 60 to 80° C. for about 3 hours using dibutyltin dilaurate as a catalyst.

The disclosure will now be further illustrated by the following examples which are not intended to limit the scope of the disclosure in any wall.

In the following examples, the tensile tests were carried out at a stretching speed of 50 mm/min in accordance with GB/T1024.2-2006.

Example 1

(1) Synthesis of Itaconic Acid-Based Polyamide 65
Salt Formation 26.02 g of itaconic acid was weighed out and dissolved in ethanol. An amount of HMDA was heated in a water bath so that it was changed from solid to liquid. 23.24 g of the liquid HMDA was weighed out and poured into the itaconic acid solution, and the mixture was reacted at about 60° C. for about 30 minutes. The resulting reaction mixture was cooled, filtered with suction, and then washed with absolute ethanol for three times. The washed crystals (that is a crystalline salt) were dried in a vacuum oven at about 40° C. for about 12 hours.

Melt Polycondensation of Salt Monomers

The salt obtained above was placed in a four-neck flask, and air within the flask was then replaced by nitrogen. The crystalline salt in the flask was subjected to a melt polycondensation reaction through agitation. The temperature of oil bath was first set to 150° C. and the agitation speed was 300 rpm. The temperature and agitation speed were maintained until the salt was melted. Then, the temperature of oil bath was increased by 10° C., and the agitation speed was reduced to 250 rpm. After 3 hours' reaction, the interior of the flask was evacuated to a pressure equal to about 0.1 MPa. Thereafter, the mixture in the flask was further reacted for 6 hours. To the resulting reaction mixture was added HMDA in an amount of 2% by weigh with respect to the amount of the crystalline salt, and the mixture was reacted for 0.5 hours so as to obtain an amino end-capped polyamide, that is the itaconic acid-based polyamide 65.

Determination of Amine Value 2 g of the sample was weighed into a conical flask, into which 50 ml of ethanol was then added. After complete dissolution, five drops of bromophenol blue indicator solution was added to the solution, and the solution was titrated with HCl standard solution until the solution color changed to yellow. Based on the concentration of the HCl standard solution and the volume of the HCl standard solution used, the amine value of the amino end-capped polyamide was determined to be 2.53.

(2) Chain Extension of Itaconic Acid-Based Polyamide 65

0.5 g of itaconic acid-based polyamide 65 obtained above was weighed out. 7.54 g of IPDI was added to DMF at a ratio of 3 to 1 in terms of [NCO]/[NH$_2$] based on the amine value determined above. A reaction between itaconic acid-based polyamide 65 and IPDI was conducted at room temperature until all the solids were dissolved.

(3) Crosslinking of Itaconic Acid-Based Polyamide 65

0.83 g of glycerol and 9.04 g of PTMG (molar ratio: 1:1) were added to the reaction mixture obtained above to conduct a reaction at 80° C. for about 3 hours using dibutyltin dilaurate as a catalyst so as to obtain polyamide 65 of polyurethane type. The amount of dibutyltin dilaurate used was 0.05% by weight with respect to the amount of IPDI.

Infrared absorption spectrums of the products obtained, in this example, after chain extension and then cross-linking of itaconic acid-based polyamide 65, respectively, are shown in FIG. 1.

Figure 2:
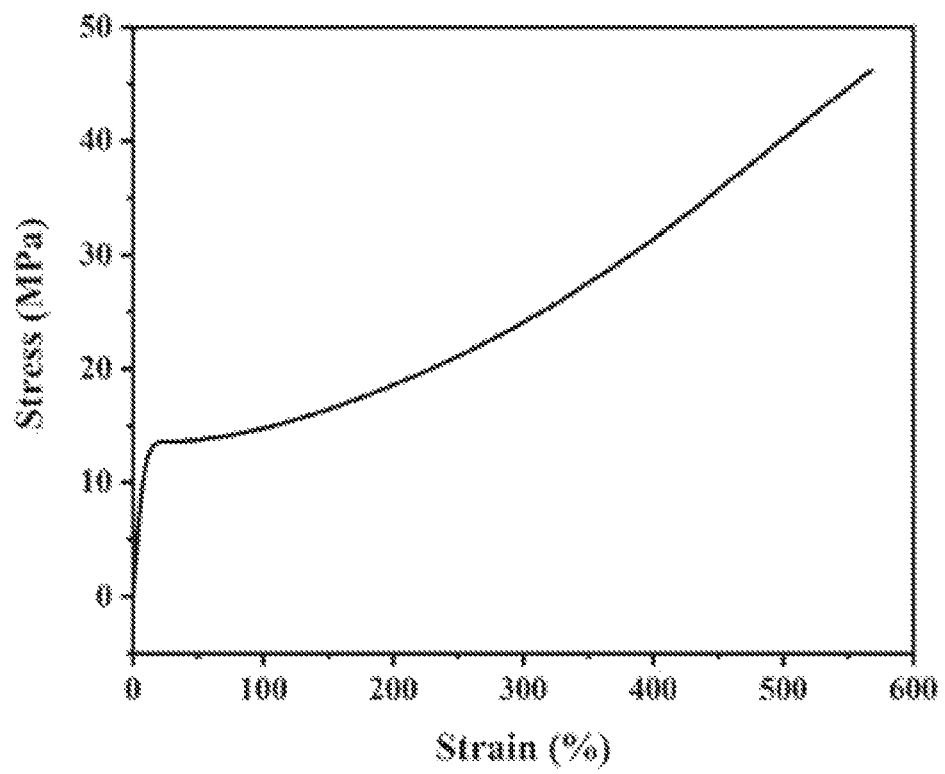
FIG. 2 represents a tensile curve of a polyamide of polyurethane type, obtained in Example 1.

A sample of the polyamide 65 of polyurethane type obtained in this example was tested for tensile property. The test results are shown in FIG. 2.

Example 2

(1) Synthesis of Itaconic Acid-Based Polyamide 65
Salt Formation 26.02 g of itaconic acid was weighed out and dissolved in ethanol. An amount of HMDA was heated in a water bath so that it was changed from solid to liquid. 23.24 g of the liquid HMDA was weighed out and poured into the itaconic acid solution, and the mixture was reacted at about 60° C. for about 30 minutes. The resulting reaction mixture was cooled, filtered with suction, and then washed with absolute ethanol for three times. The washed crystals (that is a crystalline salt) were dried in a vacuum oven at about 40° C. for about 12 hours.

Melt Polycondensation of Salt Monomers

The salt obtained above was placed in a four-neck flask, and air within the flask was then replaced by nitrogen. The crystalline salt in the flask was subjected to a melt polycondensation reaction through agitation. The temperature of oil bath was first set to 150° C. and the agitation speed was 300 rpm. The temperature and agitation speed were maintained until the salt was melted. Then, the temperature of oil bath was increased by 10° C., and the agitation speed was reduced to 250 rpm. After 3 hours' reaction, the interior of the flask was evacuated to a pressure equal to about 0.1 MPa. Thereafter, the mixture in the flask was further reacted for 6 hours. To the resulting reaction mixture was added HMDA in an amount of 2% with respect to the amount of the crystalline salt, and the mixture was reacted for 0.5 hours so as to obtain an amino end-capped polyamide, that is the itaconic acid-based polyamide 65.

Determination of Amine Value 2 g of the sample was weighed into a conical flask, into which 50 ml of ethanol was then added. After complete dissolution, five drops of bromophenol blue indicator solution was added to the solution, and the solution was titrated with HCl standard solution until the solution color changed to yellow. Based on the concentration of the HCl standard solution and the volume of the HCl standard solution used, the amine value of the amino end-capped polyamide was determined to be 2.53.

(2) Chain Extension of Itaconic Acid-Based Polyamide 65

0.5 g of itaconic acid-based polyamide 65 obtained above was weighed out. 5.68 g of HDI was added to DMF at a ratio of 3 to 1 in terms of [NCO]/[NH$_2$] based on the amine value determined above. A reaction between itaconic acid-based polyamide 65 and HDI was conducted at room temperature until all the solids were dissolved.

(3) Crosslinking of Itaconic Acid-Based Polyamide 65

0.83 g of glycerol and 9.04 g of PEG (molar ratio: 1:1) were added to the reaction mixture obtained above to conduct a reaction at about 80° C. for about 3 hours using dibutyltin dilaurate as a catalyst. The amount of dibutyltin dilaurate used was 0.05% by weight with respect to the amount of HDI.

Example 3

(1) Synthesis of Itaconic Acid-Based Polyamide 65

Salt Formation 26.02 g of itaconic acid was weighed out and dissolved in ethanol. An amount of HMDA was heated in a water bath so that it was changed from solid to liquid. 23.24 g of the liquid HMDA was weighed out and poured into the itaconic acid solution, and the mixture was reacted at about 60° C. for about 30 minutes. The resulting reaction mixture was cooled, filtered with suction, and then washed with absolute ethanol for three times. The washed crystals (that is a crystalline salt) were dried in a vacuum oven at about 40° C. for about 12 hours.

Melt Polycondensation of Salt Monomers

The salt obtained above was placed in a four-neck flask, and air within the flask was then replaced by nitrogen. The crystalline salt in the flask was subjected to a melt polycondensation reaction through agitation. The temperature of oil bath was first set to 150° C. and the agitation speed was 300 rpm. The temperature and agitation speed were maintained until the salt was melted. Then, the temperature of oil bath was increased by 10° C., and the agitation speed was reduced to 250 rpm. After 3 hours' reaction, the interior of the flask was evacuated to a pressure equal to about 0.1 MPa. Thereafter, the mixture in the flask was further reacted for 6 hours. To the resulting reaction mixture was added HMDA in an amount of 2% by weight with respect to the amount of the crystalline salt, and the mixture was reacted for 0.5 hours so as to obtain an amino end-capped polyamide, that is the itaconic acid-based polyamide 65.

Determination of Amine Value 2 g of the sample was weighed into a conical flask, into which 50 ml of ethanol was then added. After complete dissolution, five drops of bromophenol blue indicator solution was added to the solution, and the solution was titrated with HCl standard solution until the solution color changed to yellow. Based on the concentration of the HCl standard solution and the volume of the HCl standard solution used, the amine value of the amino end-capped polyamide was determined to be 2.53.

(2) Chain Extension of Itaconic Acid-Based Polyamide 65

0.5 g of itaconic acid-based polyamide 65 obtained above was weighed out. 7.54 g of IPDI was added to DMF at a ratio of 3 to 1 in terms of [NCO]/[NH$_2$] based on the amine value determined above. A reaction between itaconic acid-based polyamide 65 and IPDI was conducted at room temperature until all the solids were dissolved.

(3) Crosslinking of Itaconic Acid-Based Polyamide 65

0.83 g of glycerol and 9.04 g of PTMG (molar ratio: 1:1) were added to the reaction mixture obtained above to conduct a reaction at 60° C. for about 3 hours using dibutyltin dilaurate as a catalyst. The amount of dibutyltin dilaurate used was 0.05% by weight with respect to the amount of IPDI.

Example 4

(1) Synthesis of Itaconic Acid-Based Polyamide 65

Salt Formation 26.02 g of itaconic acid was weighed out and dissolved in ethanol. An amount of HMDA was heated in a water bath so that it was changed from solid to liquid. 23.24 g of the liquid HMDA was weighed out and poured into the itaconic acid solution, and the mixture was reacted at about 60° C. for about 30 minutes. The resulting reaction mixture was cooled, filtered with suction, and then washed with absolute ethanol for three times. The washed crystals (that is a crystalline salt) were dried in a vacuum oven at about 40° C. for about 12 hours.

Melt Polycondensation of Salt Monomers

The salt obtained above was placed in a four-neck flask, and air within the flask was then replaced by nitrogen. The crystalline salt in the flask was subjected to a melt polycondensation reaction through agitation. The temperature of oil bath was first set to 150° C. and the agitation speed was 300 rpm. The temperature and agitation speed were maintained until the salt was melted. Then, the temperature of oil bath was increased by 10° C., and the agitation speed was reduced to 250 rpm. After 3 hours' reaction, the interior of the flask was evacuated to a pressure equal to about 0.1 MPa. Thereafter, the mixture in the flask was further reacted for 6 hours. To the resulting reaction mixture was added HMDA in an amount of 2% by weight with respect to the amount of the crystalline salt, and the mixture was reacted for 0.5 hours so as to obtain an amino end-capped polyamide, that is the itaconic acid-based polyamide 65.

Determination of Amine Value 2 g of the sample was weighed into a conical flask, into which 50 ml of ethanol was then added. After complete dissolution, five drops of bromophenol blue indicator solution was added to the solution, and the solution was titrated with HCl standard solution until the solution color changed to yellow. Based on the concentration of the HCl standard solution and the volume of the HCl standard solution used, the amine value of the amino end-capped polyamide was determined to be 2.53.

(2) Chain Extension of Itaconic Acid-Based Polyamide 65

0.5 g of itaconic acid-based polyamide 65 obtained above was weighed out. 7.54 g of IPDI was added to DMF at a ratio of 3 to 1 in terms of [NCO]/[NH$_2$] based on the amine value determined above. A reaction between itaconic acid-based polyamide 65 and IPDI was conducted at room temperature until all the solids were dissolved.

(3) Crosslinking of Itaconic Acid-Based Polyamide 65

0.96 g of glycerol and 11.3 g of PTMG (molar ratio: 2:3) were added to the reaction mixture obtained above to conduct a reaction at 80° C. for about 3 hours using dibutyltin dilaurate as a catalyst so as to obtain polyamide 65 of polyurethane type. The amount of dibutyltin dilaurate used was 0.05% by weight with respect to the amount of IPDI.

Example 5

(1) Synthesis of Itaconic Acid-Based Polyamide 65

Salt Formation 26.02 g of itaconic acid was weighed out and dissolved in ethanol. An amount of HMDA was heated in a water bath so that it was changed from solid to liquid. 23.24 g of the liquid HMDA was weighed out and poured into the itaconic acid solution, and the mixture was reacted at about 60° C. for about 30 minutes. The resulting reaction mixture was cooled, filtered with suction, and then washed with absolute ethanol for three times. The washed crystals (that is a crystalline salt) were dried in a vacuum oven at about 40° C. for about 12 hours.

Melt Polycondensation of Salt Monomers

The salt obtained above was placed in a four-neck flask, and air within the flask was then replaced by nitrogen. The crystalline salt in the flask was subjected to a melt polycondensation reaction through agitation. The temperature of oil bath was first set to 150° C. and the agitation speed was 300 rpm. The temperature and agitation speed were maintained until the salt was melted. Then, the temperature of oil bath was increased by 10° C., and the agitation speed was reduced to 250 rpm. After 3 hours' reaction, the interior of the flask was evacuated to a pressure equal to about 0.1 MPa. Thereafter, the mixture in the flask was further reacted for 6 hours. To the resulting reaction mixture was added HMDA in an amount of 2% by weight with respect to the amount of the crystalline salt, and the mixture was reacted for 0.5 hours so as to obtain an amino end-capped polyamide, that is the itaconic acid-based polyamide 65.

Determination of Amine Value 2 g of the sample was weighed into a conical flask, into which 50 ml of ethanol was then added. After complete dissolution, five drops of bromophenol blue indicator solution was added to the solution, and the solution was titrated with HCl standard solution until the solution color changed to yellow. Based on the concentration of the HCl standard solution and the volume of the HCl standard solution used, the amine value of the amino end-capped polyamide was determined to be 2.53.

(2) Chain Extension of Itaconic Acid-Based Polyamide 65

0.5 g of itaconic acid-based polyamide 65 obtained above was weighed out. 7.54 g of IPDI was added to DMF at a ratio of 3 to 1 in terms of [NCO]/[NH$_2$] based on the amine value determined above. A reaction between itaconic acid-based polyamide 65 and IPDI was conducted at room temperature until all the solids were dissolved.

(3) Crosslinking of Itaconic Acid-Based Polyamide 65

0.96 g of glycerol and 6.95 g of PTMG (molar ratio: 3:2) were added to the reaction mixture obtained above to conduct a reaction at 80° C. for about 3 hours using dibutyltin dilaurate as a catalyst so as to obtain polyamide 65 of polyurethane type. The amount of dibutyltin dilaurate used was 0.05% by weight with respect to the amount of IPDI.

Comparative Example 1

(1) Synthesis of Itaconic Acid-Based Polyamide 65

Salt Formation 26.02 g of itaconic acid was weighed out and dissolved in ethanol. An amount of HMDA was heated in a water bath so that it was changed from solid to liquid. 23.24 g of the liquid HMDA was weighed out and poured into the itaconic acid solution, and the mixture was reacted at about 60° C. for about 30 minutes. The resulting reaction mixture was cooled, filtered with suction, and then washed with absolute ethanol for three times. The washed crystals (that is a crystalline salt) were dried in a vacuum oven at about 40° C. for about 12 hours.

Melt Polycondensation of Salt Monomers

The salt obtained above was placed in a four-neck flask, and air within the flask was then replaced by nitrogen. The crystalline salt in the flask was subjected to a melt polycondensation reaction through agitation. The temperature of oil bath was first set to 150° C. and the agitation speed was 300 rpm. The temperature and agitation speed were maintained until the salt was melted. Then, the temperature of oil bath was increased by 10° C., and the agitation speed was reduced to 250 rpm. After 3 hours' reaction, the interior of the flask was evacuated to a pressure equal to about 0.1 MPa. Thereafter, the mixture in the flask was further reacted for 6 hours. To the resulting reaction mixture was added HMDA in an amount of 2% by weight with respect to the amount of the crystalline salt, and the mixture was reacted for 0.5 hours so as to obtain an amino end-capped polyamide, that is the itaconic acid-based polyamide 65.

Determination of Amine Value 2 g of the sample was weighed into a conical flask, into which 50 ml of ethanol was then added. After complete dissolution, five drops of bromophenol blue indicator solution was added to the solution, and the solution was titrated with HCl standard solution until the solution color changed to yellow. Based on the concentration of the HCl standard solution and the volume of the HCl standard solution used, the amine value of the amino end-capped polyamide was determined to be 2.53.

(2) Chain Extension of Itaconic Acid-Based Polyamide 65

0.5 g of itaconic acid-based polyamide 65 obtained above was weighed out. 7.54 g of IPDI was added to DMF at a ratio of 3 to 1 in terms of [NCO]/[NH$_2$] based on the amine value determined above. A reaction between itaconic acid-based polyamide 65 and IPDI was conducted at room temperature until all the solids were dissolved.

(3) Crosslinking of Itaconic Acid-Based Polyamide 65

22.60 g of PTMG was added to the reaction mixture obtained above to conduct a reaction at 80° C. for about 3 hours using dibutyltin dilaurate as a catalyst. The amount of dibutyltin dilaurate used was 0.05% by weight with respect to the amount of IPDI.

The descriptions above are just preferred embodiments of the disclosure. Accordingly, those skilled in the art will recognize that various changes and modifications of the embodiments described herein can be made without departing from the scope and spirit of the disclosure.

What is claimed is:

1. A method for synthesizing a bio-based polyamide, comprising:
   performing a chain extending reaction of an itaconic acid-based polyamide 65 with a diisocyanate, and
   crosslinking the itaconic acid-based polyamide 65 after chain extension and a polyether polyol,
   wherein, the itaconic acid-based polyamide 65 is represented by the following structural formula:

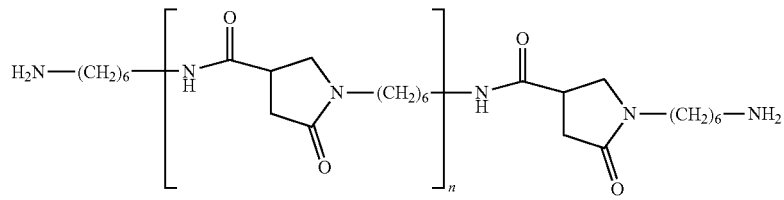

wherein, n is an integer of 2 to 300 and wherein the itaconic acid-based polyamide 65 is prepared via a two step process comprising:
   subjecting itaconic acid to be reacted with hexamethylenediamine so as to obtain amide monomers; and
   subjecting the amide monomers to melt polycondensation;
   wherein the melt polycondensation is conducted in an inert atmosphere in three stages including a first stage, a second stage, and a third stage, wherein, the second stage is performed at a temperature higher than that of the first stage, and the third stage is performed under vacuum at the same temperature as that of the second stage, wherein, at the end of the third stage, addition of hexamethylenediamine is performed so as to conduct a further reaction.

2. The method of claim 1, wherein the diisocyanate is isophorone diisocyanate or hexamethylene diisocyanate.

3. The method of claim 1, wherein the polyether polyol is polytetrahydrofuran, polyethylene glycol, or polypropylene glycol.

4. The method of claim 1, wherein the crosslinking reaction is conducted in the presence of a crosslinking agent and a catalyst.

5. The method of claim 4, wherein the crosslinking agent is glycerol.

6. A bio-based polyamide synthesized by the method according to claim 1.

7. The method of claim 4, wherein the catalyst is dibutyltin dilaurate.

* * * * *